United States Patent [19]

Murray et al.

[11] Patent Number: 5,142,631
[45] Date of Patent: Aug. 25, 1992

[54] SYSTEM FOR QUEUING INDIVIDUAL READ OR WRITE MASK AND GENERATING RESPECTIVE COMPOSITE MASK FOR CONTROLLING ACCESS TO GENERAL PURPOSE REGISTER

[75] Inventors: John E. Murray, Acton; Mark A. Firstenberg, Maynard; David B. Fite, Northboro; Michael M. McKeon, Grafton; Wiliam R. Grundmann, Hudson; David A. Webb, Jr., Berlin; Ronald M. Salett, Framingham; Tryggve Fossum, Northboro; Dwight P. Manley, Holliston; Ricky C. Hetherington, Northboro, all of Mass.

[73] Assignee: Digital Equipment Corporation, Maynard, Mass.

[21] Appl. No.: 306,773

[22] Filed: Feb. 3, 1989

[51] Int. Cl.⁵ .................................. G06F 9/38
[52] U.S. Cl. ................. 395/375; 364/DIG. 2; 364/948.34; 364/948.3; 364/958.2; 364/957.6
[58] Field of Search ... 364/200 MS File, 900 MS File

[56] References Cited

U.S. PATENT DOCUMENTS

| | | | |
|---|---|---|---|
| 4,155,120 | 5/1979 | Keefer et al. | 364/200 |
| 4,179,737 | 12/1979 | Kim et al. | 364/200 |
| 4,367,524 | 1/1983 | Budde et al. | 364/200 |
| 4,493,019 | 1/1985 | Kim et al. | 364/200 |
| 4,503,535 | 3/1985 | Budde et al. | 364/200 |
| 4,667,287 | 5/1987 | Allen et al. | 364/200 |
| 4,682,284 | 6/1987 | Schrofer | 364/200 |
| 4,722,049 | 1/1988 | Lahti | 364/200 |
| 4,789,925 | 12/1988 | Lahti | 364/200 |
| 4,891,753 | 1/1990 | Budde et al. | 364/200 |
| 4,945,511 | 7/1990 | Iomitsu et al. | 364/200 |

FOREIGN PATENT DOCUMENTS 0243892 4/1987 European Pat. Off.
2016753 9/1979 United Kingdom.

OTHER PUBLICATIONS

Acosta et al., "An Instruction Issuing Approach to Enhancing Performance in Multiple Functional Unit Processors", IEEE Trans. on Computers. vol. C-35, No. 9 (Sep. 1986), pp. 815-828.
Fossum et al., "An Overview of the VAX 8600 System", Digital Equipment Technical Journal, No. 1, Aug. 1985, pp. 8-23.
Troiani et al., "The VAX 8600 I Box, a Pipelined Implementation of the VAX Architecture", Digital Technical Journal, No. 1, Aug. 1985, pp. 24-42.
VAX Architecture Handbook, Digital Equipment Corporation, 1981, pp. 51 to 91.

*Primary Examiner*—Thomas C. Lee
*Assistant Examiner*—L. Donaghue
*Attorney, Agent, or Firm*—Arnold, White & Durkee

[57] ABSTRACT

A method is provided for preprocessing multiple instructions prior to execution of such instructions in a digital computer having an instruction decoder, an instruction execution unit, and multiple general purpose registers which are read to produce memory addresses during the preprocessing. The method comprises: (1) avoiding the preprocessing of a current instruction to read a general purpose register to produce a memory address prior to the modification of the contents of that register by a preceding instruction by (a) generating a composite write mask having a bit set for each general purpose register whose contents are to be modified by at least one of a plurality of decoded by not-yet-executed instructions preceding the current instruction, and (b) stalling the preprocessing of the current instruction when a general purpose register to be read by the current instruction is a register having a bit set in the write mask, and/or (2) avoiding the preprocessing of a current instruction which modifies the contents of a general purpose register that is to be read by a preceding instruction by (a) generating a composite read mask having a bit set for each general purpose register to be read by at least one of a plurality of decoded but not-yet-executed instructions preceding the current instruction, and (b) stalling the preprocessing of the current instruction when a general purpose register whose contents are to be modified by the current instruction is a register having a bit set in the read mask.

27 Claims, 8 Drawing Sheets

SYSTEM FOR QUEUING INDIVIDUAL READ OR WRITE MASK AND GENERATING RESPECTIVE COMPOSITE MASK FOR CONTROLLING ACCESS TO GENERAL PURPOSE REGISTER

RELATED APPLICATIONS

The present application discloses certain aspects of a computing system that is further described in the following U.S. patent application filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989, abandoned, continued in Ser. No. 97/646,522 filed Jan. 28, 1991; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., PREPROCESSING IMPLIED SPECIFIERS IN A PIPELINED PROCESSOR, Ser. No. 07/306,846 filed Feb. 3, 1989; D. Fite et al., BRANCH PREDICTION, Ser. No. 07/306,760 filed Feb. 3, 1989; Fossum et al., PIPELINED FLOATING POINT ADDER FOR DIGITAL COMPUTER, Ser. No. 07/306,343 filed Feb. 3, 1989, and issued as U.S. Pat. No. 4,994,996 on Feb. 19, 1991; Grundmann et al., SELF TIMED REGISTER FILE, Ser. No. 07/306,445 filed Feb. 3, 1989; Beaven et al., METHOD AND APPARATUS FOR DETECTING AND CORRECTING ERRORS IN A PIPELINED COMPUTER SYSTEM, Ser. No. 07/306,828 filed Feb. 3, 1989 and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989, and issued as U.S. Pat. No. 4,985,825 on Jan. 15, 1991; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989, now abandoned, and continued in Ser. No. 07/746,007 filed Aug. 9, 1991; Hetherington, WRITE BACK BUFFER WITH ERROR CORRECTING CAPABILITIES, Ser. No. 07/306,703 filed Feb. 3, 1989, and issued as U.S. Pat. No. 4,995,041 on Feb. 19, 1991; Chinnaswamy et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov. 6, 1990; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989, and issued as U.S. Pat. No. 4,965,793 on Oct. 23, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989 and issued as U.S. Pat. No. 4,043,874 on Aug. 27, 1991; Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989, abandoned, continued in Ser. No. 07/582,493 filed Sept. 14, 1990.

TECHNICAL FIELD

The present invention relates generally to digital computers and, more particularly, to a system for resolving data dependencies during the preprocessing of multiple instructions prior to execution of those instructions in a digital computer. This invention is particularly applicable to the preprocessing of multiple instructions in a pipelined digital computer system using a variable-length complex instruction set (CIS) architecture.

DESCRIPTION OF RELATED ART

Preprocessing of instructions is a common expedient used in digital computers to speed up the execution of large numbers of instructions. The preprocessing operations are typically carried out by an instruction unit interposed between the memory that stores the instructions and the execution unit that executes the instructions. The preprocessing operations include, for example, the prefetching of operands identified by operand specifiers in successive instructions so that the operands are readily available when the respective instructions are loaded into the execution unit. The instruction unit carries out the preprocessing operations for subsequent instructions while a current instruction is being executed by the execution unit, thereby reducing the overall processing time for any given sequence of instructions.

The preprocessing of instructions can give rise to "data dependency" problems when the instruction unit changes the contents of a storage location that is needed by an instruction not yet fully executed by the execution unit. When the only data dependency problem is potential modification of the contents of a register during the execution of an instruction, before that same register is read by the preprocessing unit for preprocessing a subsequent instruction, the problem can be deferred to the execution unit by simply passing register pointers to the execution unit. Thus the register contents are not read during the preprocessing of an instruction, but rather during the execution of that instruction.

When registers are used to produce memory addresses, however, as in indirect or deferred addressing, effective preprocessing of instructions requires that the registers be accessed and sometimes changed during preprocessing. Thus the data dependency problem becomes more severe, particularly when multiple instructions are pre-processed, presenting the potential of changing the contents of several different registers identified by multiple instructions following an instruction that has not yet been completely executed. A premature change of register contents can be required by the preprocessing of an instruction that reads a register to produce a memory address before the contents of that register have been changed by a preceding instruction that is not yet fully executed. A somewhat different, but equally serious, data dependency problem occurs when the preprocessing read operations include autoincrementing or autodecrementing functions which modify the contents of registers.

"Autoincrement" and "autodecrement" are addressing modes of a digital computer that includes built-in hardware for automatically stepping a register through the sequential elements of a table or array. Thus, the contents of a register may be stepped through a series of addresses so that it always points to the next sequential element of a table. The register is incremented or decremented by 1, 2, 4 or 8 depending upon the data type, i.e., whether the operand is 1, 2, 4 or 8 bytes in length. In the autoincrement mode, the register contents are incremented after being used as the address of the operand; in the autodecrement mode, the register contents are decremented before being used as the address of the operand.

SUMMARY OF THE INVENTION

There is provided a method of preprocessing multiple instructions prior to execution of such instructions in a digital computer having an instruction decoder, an instruction execution unit, and multiple general purpose registers, and in which the general purpose registers are read to produce memory addresses during the preprocessing of said instructions, said method comprising (1) avoiding the preprocessing of a current instruction to read a general purpose register to produce a memory address prior to the modification of the contents of that register by a preceding instruction by (a) generating a composite write mask having a bit set for each general purpose register whose contents are to be modified by at least one of a plurality of decoded but not-yet-executed instructions preceding the current instruction, and (b) stalling the preprocessing of the current instruction when a general purpose register to be read by the current instruction is a register having a bit set in the write mask, and/or (2) avoiding the preprocessing of a current instruction to modify the contents of a general purpose register read by a preceding instruction by (a) generating a composite read mask having a bit set for each general purpose register to be read by at least one of a plurality of decoded but not-yet-executed instructions preceding the current instruction, and (b) stalling the preprocessing of the current instruction when a general purpose register whose contents are to be modified by the current instruction is a register having a bit set in the read mask.

Two specific data dependency problems and their resolution by the present invention are illustrated by the following examples:

CASE 1: An instruction uses a general purpose register (GPR) to address memory, and the contents of that GPR are to be changed by execution of a previously decoded but not-yet-executed instruction. This problem is exemplified by the following pair of instructions:

---
MOVAL X R0
ADDL3 (R0), R1, R2
---

Execution of the first instruction moves the long word address specified by the label X to the register R0. Execution of the second instruction adds the contents at the address in the register R0 to the contents of register R1 and stores the sum in register R2. An instance of register conflict occurs when the R0 operand of the "ADDL3" instruction is fetched before the previous "MOVAL" instruction has its result stored in the register R0. To detect this case of register conflict, a write mask is generated for each decoded instruction to indicate the registers, if any, that have contents which are changed by execution of that instruction. The write masks for all the decoded but not-yet-executed instructions are queued and used to form a composite write mask for all such instructions. Then during the preprocessing of an instruction that produces memory addresses using data in a GPR, the write masks for the previously decoded but not-yet-executed (i.e., not retired) instructions are inspected to determine whether the GPR containing the address from which an operand is being fetched is a register identified by the write masks as a register whose contents ar to be changed by a previous instruction. If the answer is affirmative, the fetching is stalled until the register conflict no longer exists.

In the specific example, the "MOVAL" instruction has a write mask of (000000000000012), which includes a respective bit position for each of fifteen GPRs; the least significant bit position is set to indicate that the "MOVAL" instruction changes the contents of register R0. During the fetching of the operands for the "ADDL3" instruction, the contents of register R0 are needed, and therefore the least significant bit position of the write mask for the previous "MOVAL" instruction is inspected; since this bit position is set, the fetching is stalled until execution of the "MOVAL" instruction is completed. The stall is terminated when the least significant bit is cleared by removal of the write mask for the "MOVAL" instruction from the mask queue upon completion of the execution of that instruction.

CASE 2: The fetching of operands for an instruction changes the contents of a GPR used to produce a memory address, and the contents of that GPR are to be read by execution of a previously decoded but not-yet-executed instruction. This problem is illustrated by the following pair of instructions:

---
ADDL R3, R0, R4
MOVL (R0)+, R1
---

In this example, the "+" sign after (R0) causes an autoincrement of the contents of register R0. An instance of register conflict would occur if the autoincrement were to change the contents of the register R0 before those contents were read during execution of the previous "ADDL" instruction. To avoid this case of register conflict, a read mask is generated for each decoded instruction to indicate the registers, if any, that have contents which are read during execution of the instruction. The read masks for all the decoded but not-yet-executed instructions are queued and used to form a composite read mask for all such instructions. Then during the fetching of operands for an instruction in which the contents of a GPR are changed during the fetch (e.g., an autoincrement or auto-decrement of a GPR) the read masks for previously decoded instructions not yet fully executed (i.e., not retired) are inspected to determine whether the GPR having contents to be changed is a register identified by the read masks as a register to be read during execution of the previous instruction. If the answer is affirmative, the fetching is stalled until the register conflict no longer exists.

In the above example, the "ADDL" instruction has a read mask of (0000000000010012) indicating that the execution unit will read the contents of registers R3 and R0. During the fetching of the operands for the "MOVL" instruction, the contents of register R0 are to be autoincremented, and therefore the least significant bit position of the read mask for the previous "ADDL" instruction is inspected; since this bit position is set, the fetching is stalled until execution of the "ADDL" instruction is completed. The stall is terminated when the least significant bit is cleared by removal of the read mask for the "ADDL" instruction from the mask queue upon completion of the execution of that instruction.

As can be seen from the two exemplary cases described above, the read and write masks are used to avoid the reading of a register to produce a memory address either (1) prior to the modification of the contents of that register by a preceding instruction or (2) subsequent to the modification of the contents of that register by a subsequent instruction. In the first case, the reading of the register by the subsequent instruction is stalled until the preceding instruction writes to that register. The write mask is used for this purpose. In the second case, the modification of the register contents by the subsequent instruction is stalled until the preceding instruction reads that register. The read mask is used for this purpose. That is, the adjective describing the mask always refers to the operation (read or write) to be performed by the preceding instruction.

BRIEF DESCRIPTION OF THE DRAWINGS

Other objects and advantages of the invention will become apparent upon reading the following detailed description and upon reference to the accompanying drawings, in which.

Figure 1:
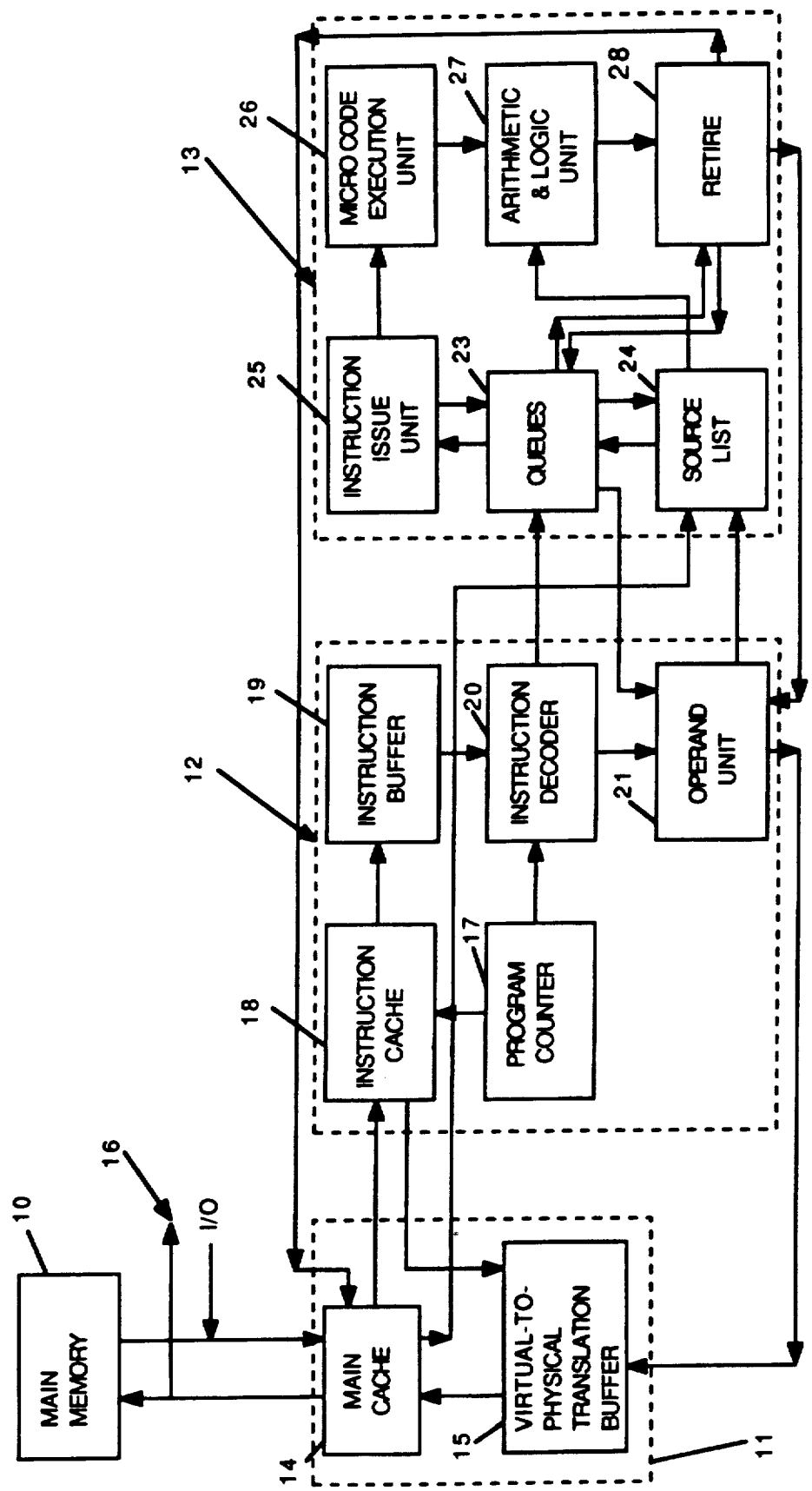
FIG. 1 is a block diagram of a central processing unit which uses a set of queues, including a mask queue, to fetch operands, for subsequent instructions before an execution unit executes a prior instruction.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings and referring first to FIG. 1, there is shown a portion of a digital computer system which includes a main memory 10, a memory-CPU interface unit 11, and at least one CPU comprising an instruction unit 12 and an execution unit 13. It should be understood that additional CPUs could be used in such a system by sharing the main memory 10. Both data and instructions for processing the data are stored in addressable storage locations within the main memory 10. An instruction includes an operation code (opcode) that specifies, in coded form, an operation to be performed by the CPU, and operands identified by specifiers that provide the information needed to locate the operands.

The execution of an individual instruction is broken down into multiple smaller tasks. These tasks are performed by dedicated, separate, independent functional units that are optimized for that purpose.

Although each instruction ultimately performs a different operation, many of the smaller tasks into which each instruction is broken are common to all instructions. Generally, the following steps are performed during the execution of an instruction: instruction fetch, instruction decode, operand fetch, execution, and result store. Thus, by the use of dedicated hardware stages, the steps can be overlapped in a pipelined operation, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process is analogous to an assembly line in a manufacturing environment. Each worker is dedicated to performing a single task on every product that passes through his or her work stage. As each task is performed the product comes closer to completion. At the final stage, each time the worker performs his assigned task a completed product rolls off the assembly line.

In the particular system illustrated in FIG. 1, the interface unit 11 includes a main cache 14 which on an average basis enables the instruction and execution units 12 and 13 to process data at a faster rate than the access time of the main memory 10. This cache 14 includes means for storing selected predefined blocks of data elements, means for receiving requests from the instruction unit 12 via a translation buffer 15 to access a specified data element, means for checking whether the data element is in a block stored in the cache, and means operative when data for the block including the specified data element is not so stored for reading the specified block of data from the main memory 10 and storing that block of data in the cache 14. In other words, the cache provides a "window" into the main memory, and contains data likely to be needed by the instruction and execution units.

If a data element needed by the instruction unit 12 or execution unit 13 is not found in the cache 14, then the data element is obtained from the main memory 10, but in the process, an entire block, including additional data, is obtained from the main memory 10 and written into the cache 14. Due to the principle of locality in time and memory space, the next time the instruction and execution units desire a data element, there is a high degree of likelihood that this data element will be found in the block which includes the previously addressed data element. Consequently, there is a high degree of likelihood that the cache 14 will already include the data element required by the instruction and execution units 12 and 13. In general, since the cache 14 will be accessed at a much higher rate than the main memory 10, the main memory can have a proportionally slower access time than the cache 14 without substantially degrading the average performance of the data processing system. Therefore, the main memory 10 can be comprised of slower and less expensive memory elements.

The translation buffer 15 is a high speed associative memory which stores the most recently used virtual-to-physical address translations. In a virtual memory system, a reference to a single virtual address can cause several memory references before the desired information is made available. However, where the translation buffer 15 is used, translation is reduced to simply finding a "hit" in the translation buffer 15.

An I/O bus 16 is connected to the main memory 10 and the main cache 14 for transmitting commands and input data to the system and receiving output data from the system.

The instruction unit 12 includes a program counter 17 and an instruction cache 18 and an instruction buffer 19 for fetching instructions from the main cache 14. From the buffer 19, new instructions are fed to an instruction decoder 20 which decodes both the op-codes and the specifiers. An operand processing unit (OPU) 21 fetches the specified operands and supplies them to the execution unit 13.

The program counter 17 is maintained in the instruction unit 12, so that the proper instructions can be retrieved from the cache 14. The program counter 17 preferably uses virtual memory locations rather than the physical memory locations of the main memory 10 and the cache 14. Thus, the virtual address of the program counter 17 must be translated into the physical address of the main memory 10 before instructions can be retrieved. Accordingly, the contents of the program counter 17 are transferred to the interface unit 11 where the translation buffer 15 performs the address conversion. The instruction is retrieved from its physical memory location in the cache 14 using the converted address. The cache 14 delivers the instruction over data return lines to the instruction decoder 20. The general organization and operation of the cache 14 and the translation buffer 15 are further described in Chapter 11 of Levy and Eckhouse, Jr., Computer Programming and Architecture, The VAX-11, Digital Equipment Corporation, pp. 351-368 (1980).

The OPU 21 also produces virtual addresses. In particular, the OPU 21 produces virtual addresses for memory source (read) and destination (write) operands. For at least the memory read operands, the OPU 21 must deliver these virtual addresses to the interface unit 11 where they are translated to physical addresses. The physical memory locations of the cache 14 are then accessed to fetch the operands for the memory source operands.

In each instruction, the first byte contains the opcode, and the following bytes are the operand specifiers to be decoded. The first byte of each specifier indicates the addressing mode for that specifier. This byte is usually broken in halves, with one half specifying the addressing mode and the other half specifying the register to be used for addressing.

The first step in processing the instructions is to decode the "opcode" portion of the instruction. The first portion of each instruction consists of its opcode which specifies the operation to be performed in the instruction. The decoding is done using a table-look-up technique in the instruction decoder 20. The instruction decoder finds a microcode starting address for executing the instruction in a look-up table and passes the starting address to the execution unit 13. Later the execution unit performs the specified operation by executing prestored microcode, beginning at the indicated starting address. Also, the decoder determines where source-operand and destination-operand specifiers occur in the instruction and passes these specifiers to the OPU 21 for preprocessing prior to execution of the instruction.

The look-up table is organized as an array of multiple blocks, each having multiple entries. Each entry can be addressed by its block and entry index. The opcode byte addresses the block, and a pointer from an execution point counter (indicating the position of the current specifier in the instruction) selects a particular entry in the block. The entry specifies the data context (byte, word, etc.), data type (address, integer, etc.) and accessing mode (read, write, modify, etc.) for each specifier.

After an instruction has been decoded, the OPU 21 parses the operand specifiers and computes their effective addresses; this process involves reading GPRs and possibly modifying the GPR contents by autoincrementing or autodecrementing. The OPU passes these effective addresses to the interface unit 11 which either returns the operand data (in the case of a read) to the source list 24 in the execution unit 13 or translates the effective address to a physical write address and awaits the data from the execution unit (in the case of a write) or does both (in the case of a modify).

Each time an instruction is passed to the execution unit, the instruction unit sends a microcode dispatch address and a set of pointers for (1) the locations in the execution-unit register file where the source operands can be found, and (2) the location where the results are to be stored. Within the execution unit, a set of queues 23 includes a fork queue for storing the microcode dispatch address, a source pointer queue for storing the source-operand locations, and a destination pointer queue for storing the destination location. Each of these queues is a FIFO buffer capable of holding the data for multiple instructions.

The execution unit 13 also includes a source list 24, which is a multi-ported register file containing a copy of the GPRs and a list of source operands. Thus entries in the source pointer queue will either point to GPR locations for register operands, or point to the source list for memory and literal operands. Both the interface unit 11 and the instruction unit 12 write entries in the source list 24, and the execution unit 13 reads operands out of the source list as needed to execute the instructions. For executing instructions, the execution unit 13 includes an instruction issue unit 25, a microcode execution unit 26, an arithmetic and logic unit (ALU) 27, and a retire unit 28.

Figure 2:
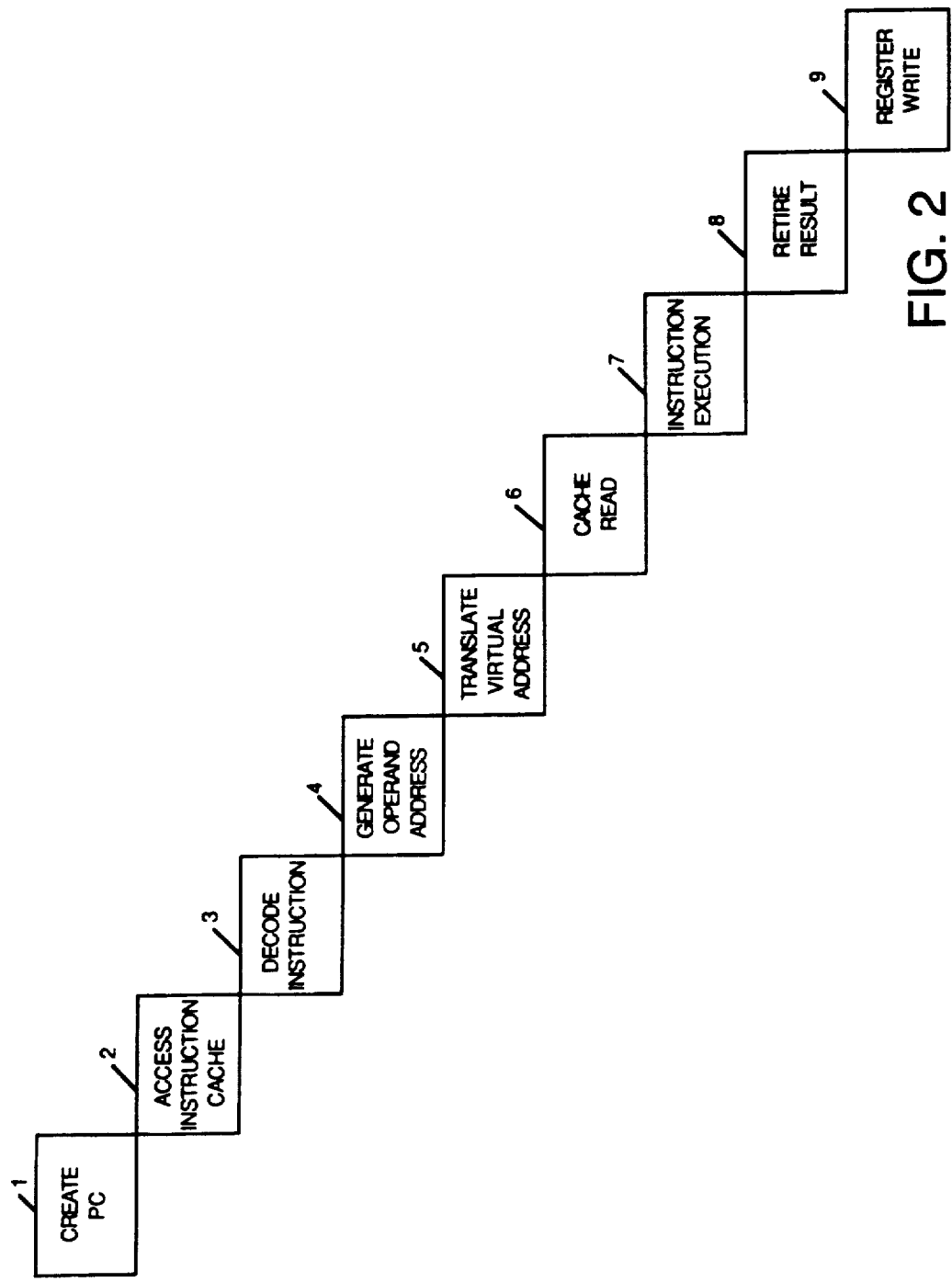
FIG. 2 is a diagram showing various steps performed to process an instruction and which may be performed in parallel for different instructions by a pipelined instruction processor according to FIG. 1.

The present invention is particularly useful with pipelined processors. As discussed above, in a pipelined processor the processor's instruction fetch hardware may be fetching one instruction while other hardware is decoding the operation code of a second instruction, fetching the operands of a third instruction, executing a fourth instruction, and storing the processed data of a fifth instruction. FIG. 2 illustrates a pipeline for a typical instruction such as:

---
ADDL3 R0, B 12 (R1). R2
---

This is a long-word addition using the displacement mode of addressing.

In the first stage of the pipelined execution of this instruction, the program count (PC) of the instruction is created; this is usually accomplished either by incrementing the program counter from the previous instruction, or by using the target address of a branch instruction. The PC is then used to access the instruction cache 18 in the second stage of the pipeline.

In the third stage of the pipeline, the instruction data is available from the cache 18 for use by the instruction decoder 20, or to be loaded into the instruction buffer 19. The instruction decoder 20 decodes the opcode and the three specifiers in a single cycle, as will be described in more detail below. The R1 number along with the byte displacement is sent to the OPU 21 at the end of the decode cycle.

In stage 4, the R0 and R2 numbers are passed as pointers to the queue unit 23. Also, the operand unit 21 reads the contents of its GPR register file at location R1, adds that value to the specified displacement (12), and sends the resulting address to the translation buffer 15 in the interface unit 11, along with an OP READ request, at the end of the address generation stage. The OPU also sends a "source list pointer" to the queue unit 23 to reserve an entry in a "source list" queue (24 in FIG. 3) for the second operand.

In stage 5, the interface unit 11 selects the address generated in stage 4 for execution. Using the translation buffer 15, the interface unit 11 translates the virtual address to a physical address during the address translation stage. The physical address is then used to address the cache 14, which is read in stage 6 of the pipeline, and data is returned to the source list 24.

In stage 7 of the pipeline, the instruction is issued to the ALU 27 which adds the two operands and sends the result to the retire unit 28. During stage 4, the register numbers for R1 and R2, and a pointer to the source list location for the memory data, was sent to the execution unit and stored in the pointer queues. Then during the cache read stage, the execution unit started to look for the two source operands in the source list. In this particular example it finds only the register data in R0, but at the end of this stage the memory data arrives and is substituted for the invalidated read-out of the register file. Thus both operands are available in the instruction execution stage.

In the retire stage 8 of the pipeline, the result data is paired with the next entry in a retire queue in the retire unit 28. Although several functional execution units can be busy at the same time, only one instruction can be retired in a single cycle.

In the last stage 9 of the illustrative pipeline, the data is written into the GPR portion of the register files in both the execution unit 13 and the instruction unit 12.

Figure 3:
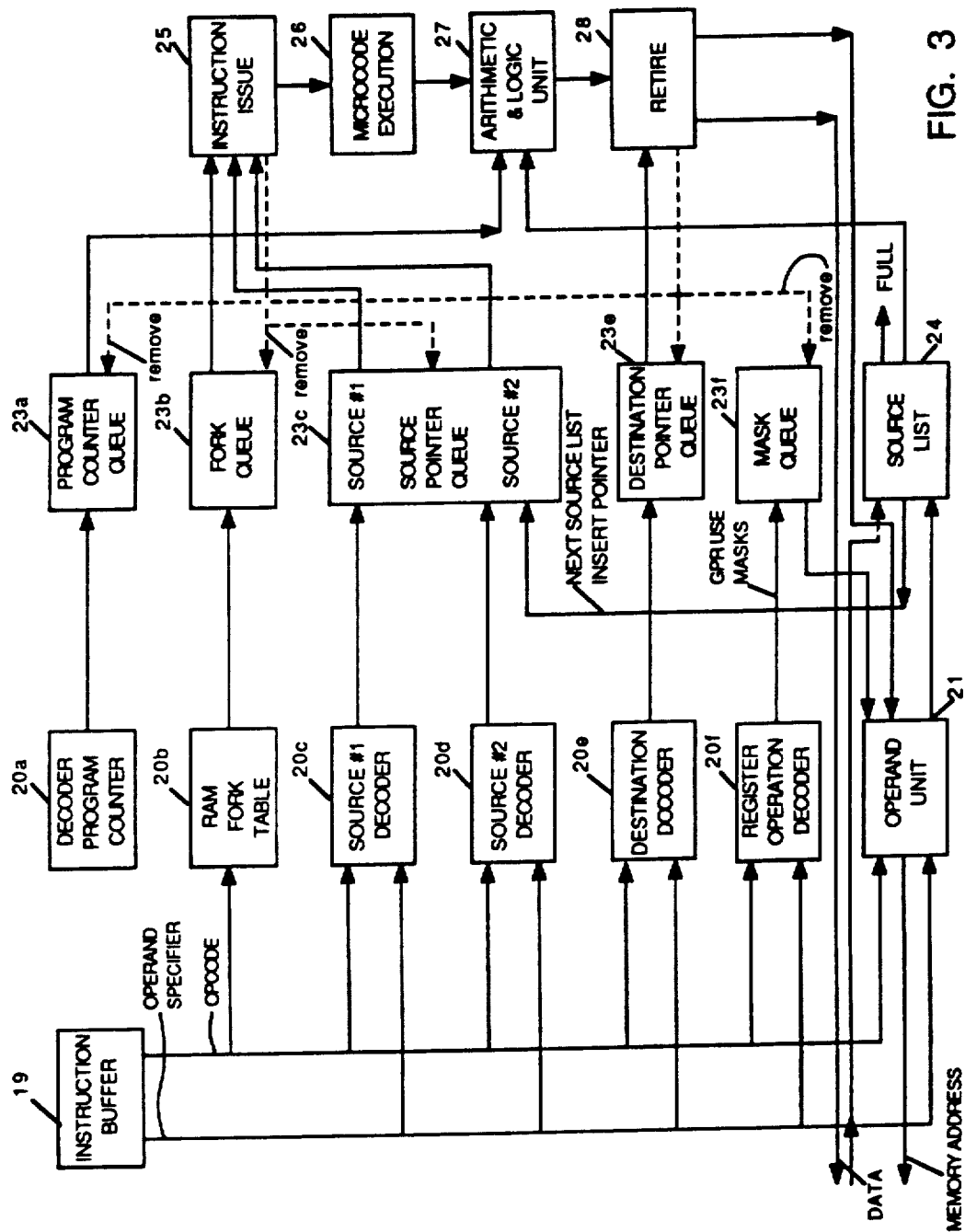
FIG. 3 is a block diagram of the instruction processor of FIG. 1 showing in further detail the instruction decoder and the queues.

The instruction decoder 20 in the instruction unit 12, and the queues 23 in the execution unit 13, are shown in more detail in FIG. 3. It can be seen that the decoder 20 includes a decoder 20a for the program counter, a fork table RAM 20b, two source-operand specifier decoders 20c and 20d, a destination-operand specifier decoder 20e, and a register-operation decoder 20f which will be described in detail below. In a preferred embodiment, the decoders are intimately interlinked and integrated into a large complex decode unit, as further described in the above referenced Fite et al. U.S. patent application Ser. No. 07/307,347, filed Feb. 3, 1989, entitled "Decoding Multiple Specifiers in a Variable Length Instruction Architecture," incorporated herein by reference.

The output of the program-counter decoder 20a is stored in a program counter queue 23a in the execution unit 13. The RAM 20b receives only the opcode byte of each instruction, and uses that data to select a "fork" (microcode) dispatch address from a table. This dispatch address identifies the start of the microcode appropriate to the execution of the instruction, and is stored in a fork queue 23b in the execution unit 13.

Each of the four decoders 20c-20f receives both the opcode byte and the operand specifier data from the instruction buffer 19. The decoders 20c and 20d decode two source-operand specifiers to generate source-operand pointers which can be used by the execution unit to locate the two source operands. These two pointers are stored in a source-pointer queue 23c in the execution unit. The destination-operand specifier is decoded by the decoder 20e to generate a destination-operand pointer which is stored in a destination-pointer queue 23e in the execution unit.

In order to check for the register conflicts discussed above, a pair of masks are generated each time a new instruction is decoded, to identify all GPRs that the execution unit will read or write during the execution of that instruction. These masks are generated in the register-operation decoder 20f (described below in connection with FIG. 4) and are stored in a mask queue 23f in the instruction unit. Each mask comprises a number of bit positions equal to the number of GPRs. In the read mask, a bit is set for each GPR to be read during execution of the new instruction, and in the write mask, a bit is set for each GPR to be written during execution of that instruction.

Both the read and write masks for a given instruction are stored as a single entry in the mask queue 23f. When there are fifteen GPRs, each entry in the mask queue consists of thirty bits (fifteen bits in each read mask to identify GPRs to be read and fifteen bits in each write mask to identify GPRs to be written). The composite of all the valid masks in the mask queue 23f is used to check each register to be used to produce a memory address during the preprocessing of instructions in the instruction unit 12 to determine whether the preprocessing of that instruction should be stalled, as will be described in more detail below.

Figure 4:
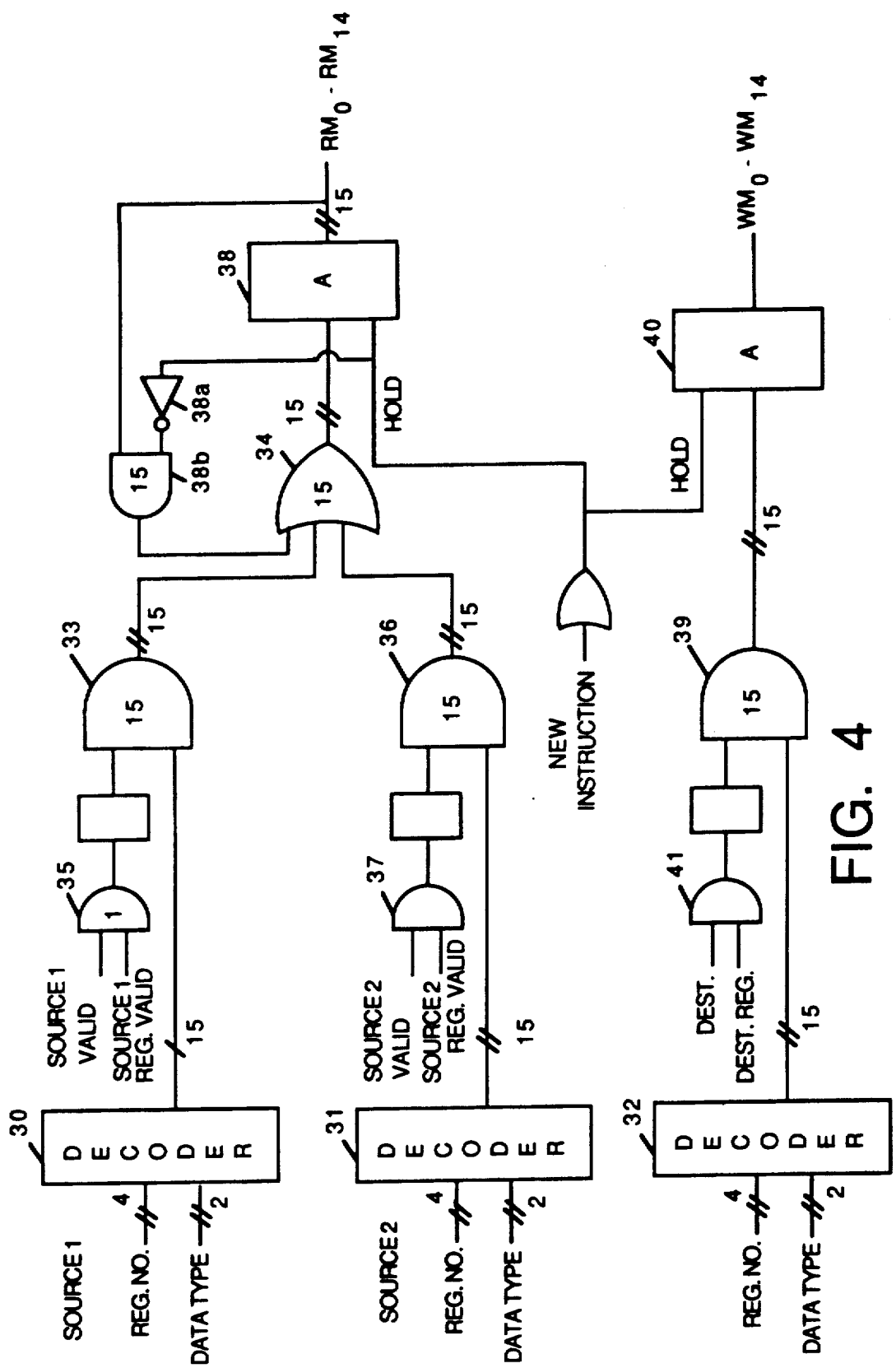
FIG. 4 is a block diagram of the mask queue and its associated circuits for inserting and removing GPR use masks and for flushing the queue, and for generating composite read and write masks.

Circuitry for generating the read and write mask for each newly decoded instruction, in the register-operation decoder 20f, is illustrated in FIG. 4. This circuitry includes three decoders 30, 31 and 32; the first two decoders 30 and 31 receive two 4-bit register numbers from the source-operand specifiers, and the third decoder 32 receives a 4-bit register number from the destination-operand specifier. (The numbers of bits carried by respective data lines shown in FIG. 4 are indicated by respective numerals adjacent to double slash symbols "//" intersecting the respective lines.) In addition to the register number, each of the decoders 30, 10 31 and 32 receives a 2-bit data-type number which indicates the number of registers to be used (1, 2, 3 or 4) for the particular format being used at any given time. Some formats use 8 bits, 16 bits, or 32 bits (requiring one register), others use 64 bits (requiring two registers), and others use 128 bits (requiring four registers).

The two decoders 30 and 31 set corresponding bits in a 15-bit output; the set bits identify the particular GPRs to be read by the execution unit for one particular specifier.

From the decoder 30, the fifteen outputs are supplied to an array of fifteen AND gates 33 whose outputs are connected to an array of fifteen OR gates 34. The second input to each of the AND gates 33 is the output of an AND gate 35 whose inputs are asserted when the first source-operand specifier and the register number from that specifier are valid.

The fifteen outputs from the decoder 31 are similarly supplied to an array of fifteen AND gates 36 whose outputs are connected to the array of OR gates 34. The second input to each of the AND gates 36 is the output of an AND gate 37 whose inputs are asserted when the second source-operand specifier and the register number from that specifier are valid.

The fifteen outputs of the OR-gate array 34 produces a single 15-bit read mask, comprising bits RM0 through RM14, to be stored in the mask queue 23f. A recirculating register 38 provides a buffer between the OR gates 34 and the mask queue 23f. In the preferred embodiment of the instruction decoder referred to above, it is possible that source specifiers for the same instruction will be decoded different cycles of the system clock, and therefore the output of the register 38 is recirculated through a set of AND gates 38b feeding back to the OR gates 34 until a new instruction is decoded. The AND gates 38b are therefore enabled by the inversion of the HOLD signal, as provided by an inverter 38a.

The third decoder 32 determines which of the fifteen GPRs are to be used as a destination of the result produced by execution of the newly decoded instruction. This decoder 32 sets from one to four of fifteen bits corresponding to the fifteen GPRs, with the set bits identifying the particular GPRs to be used as the destination. From the decoder 32, the fifteen outputs are supplied to an array of fifteen AND gates 39. The output of the register is the 15-bit write mask, comprising bits WM0 through WM14, which are stored in the mask queue 23f. The second input to each of the AND gates 39 is the output of an AND gate 41 whose inputs are asserted when the destination-operand specifier and the register number from that specifier are valid.

Figure 5:
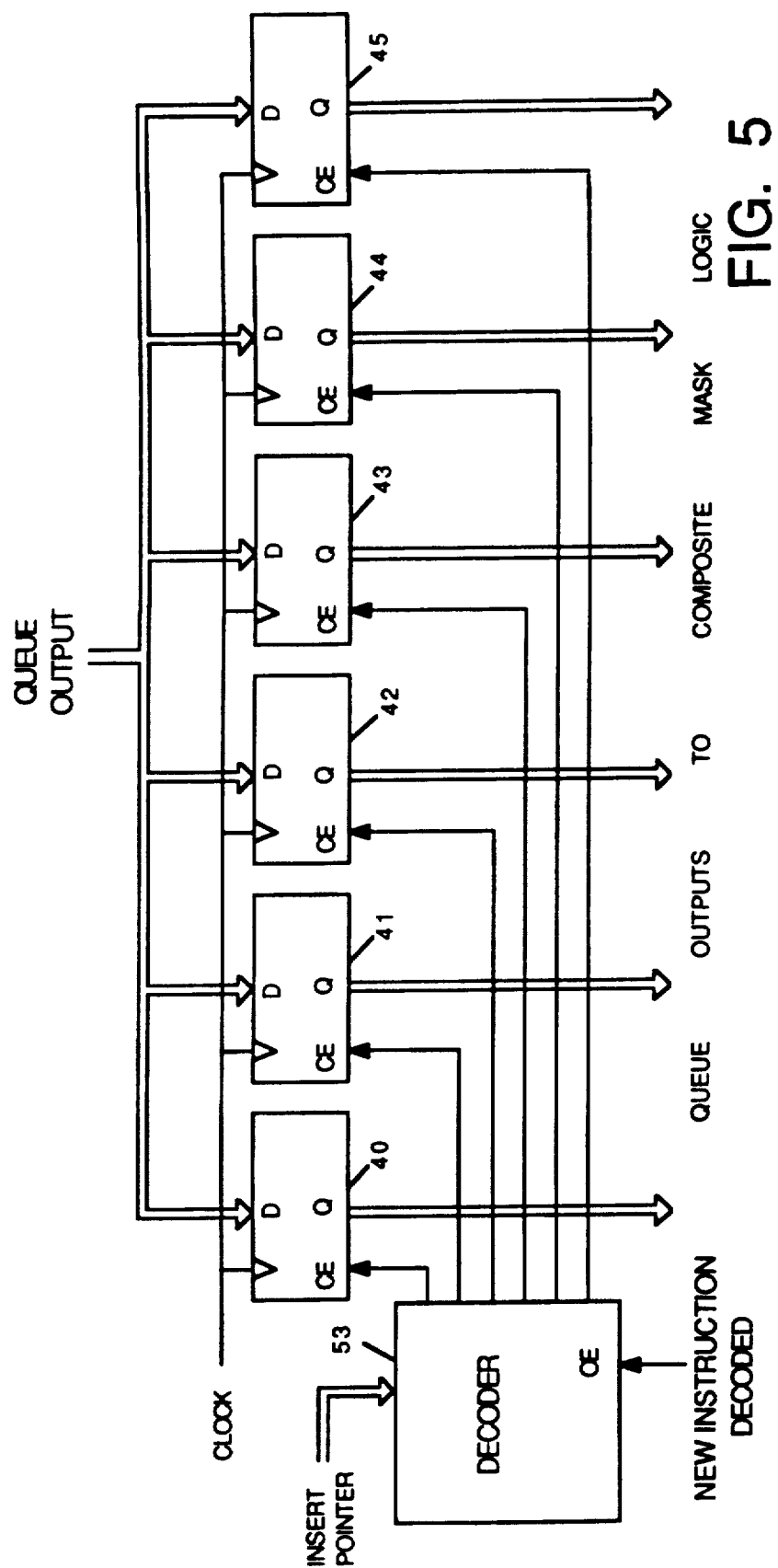
FIG. 5 is a detailed schematic diagram of the mask queue.
Figure 6:
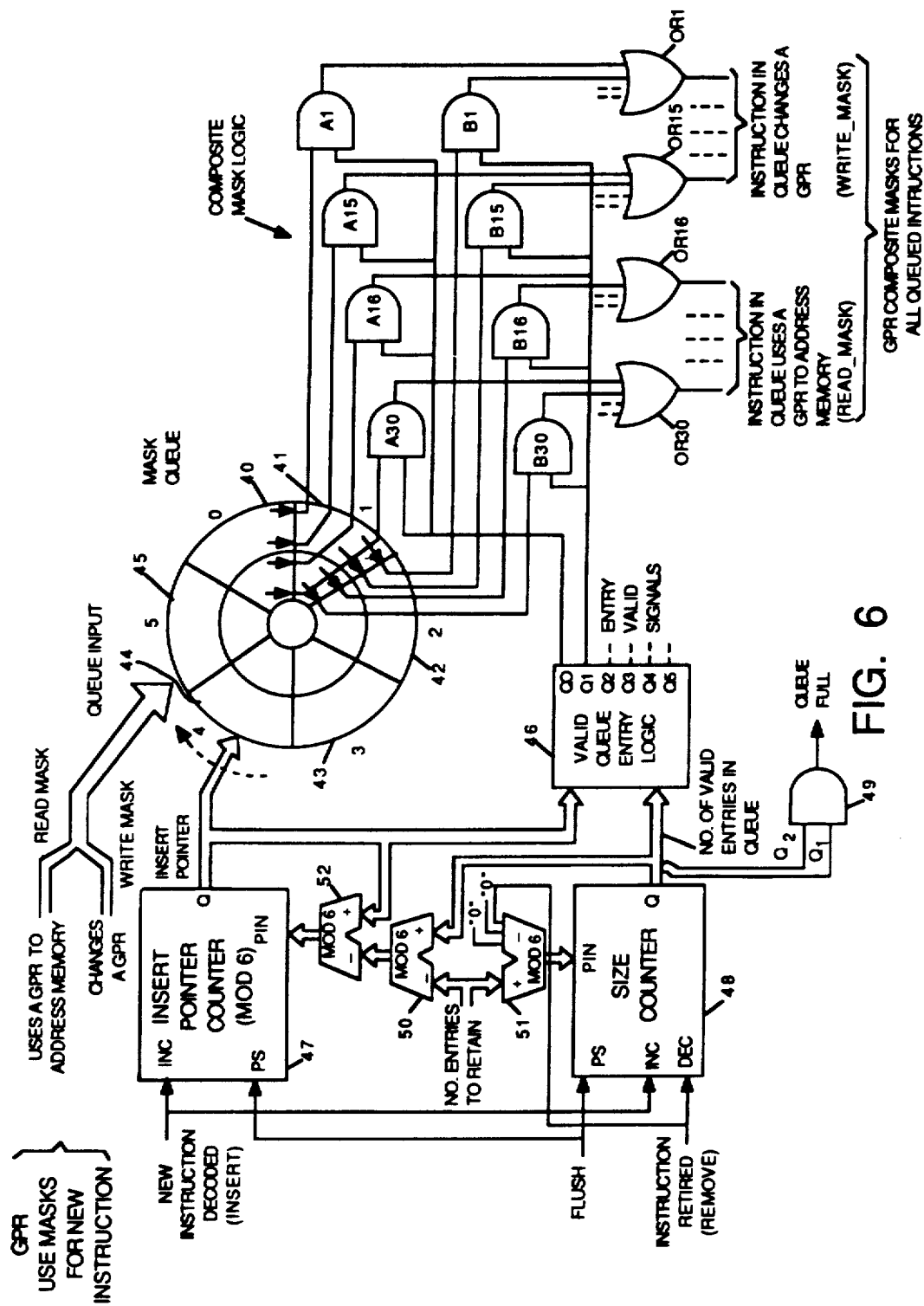
FIG. 6 is a schematic diagram of mask-generating circuitry for use in the system of FIGS. 1-4.

As illustrated in FIGS. 5 and 6, the mask queue 23f is a first-in, first-out (FIFO) circular buffer including six registers 40-45 to accommodate the entry of read and write masks for six different instructions. The thirty bits in each register are connected to thirty parallel AND gates such as the gates A1-A30 and B1-B30 for registers 40 and 41, respectively. The thirty AND gates in each group all receive a common signal from valid-queue-entry logic 46. This logic keeps track of the number of valid masks in the mask queue 23f at all times, and the particular registers in which those masks are located. The two inputs to the valid-queue-entry logic 46 are (1) an "insert pointer" signal from an insert pointer counter 47 and (2) a "size" signal from a size counter 48. The logic 46 responds to these two inputs to produce control signals at six different outputs according to the logic in Table I.

TABLE I

| in- | size | | | | | | |
|---|---|---|---|---|---|---|---|
| sert | 000 | 001 | 010 | 011 | 100 | 101 | 110 |
| 000 | 000000 | 100000 | 110000 | 111000 | 111100 | 111110 | 111111 |
| 001 | 000000 | 000001 | 100001 | 110001 | 111001 | 111101 | 111111 |
| 010 | 000000 | 000010 | 000011 | 100011 | 110011 | 111011 | 111111 |
| 011 | 000000 | 000100 | 000110 | 000111 | 100111 | 110111 | 111111 |
| 100 | 000000 | 001000 | 001100 | 001110 | 001111 | 101111 | 111111 |
| 101 | 000000 | 010000 | 011000 | 011100 | 011110 | 011111 | 111111 |

As can be seen in Table I, the "insert pointer" signal indicates which of the six mask-queue registers, if any, is to be the next register to be loaded with a mask, while the "size" signal indicates how many of the six registers, if any, contain masks at any given time. Thus, the insert pointer counter counts from zero to five, and the size counter counts from zero to six (to permit the generation of signals indicating empty and full conditions). As an example, if the "insert pointer" signal is 010 (indicating that the last register to be loaded with a mask was register 42) and the "size" signal is 010 (indicating that the mask queue presently contains only two masks), the logic 46 determines that the two masks must be in registers 42 and 41 (see Table I). Thus, the logic 46 asserts the outputs Q0 and Q1, i.e., the six outputs from the logic 46 are 000011. This enables the AND gates B1-B30 and C1-C30 (not shown) to pass the masks from registers 41 and 42.

Both the insert pointer counter 47 and the size counter 48 are incremented each time a new instruction is decoded, and the size counter 48 is decremented each time the execution of an instruction is completed. The Q1 and Q2 outputs of the size counter 48 are supplied to an AND gate 49 to produce a control signal indicating that the mask queue is full when both these bits are set (bits Q1 and Q2 represent a decimal 6 when both bits are set, indicating that the mask queue contains six valid mask entries). This "queue full" signal stalls the decoding of any further instructions until space becomes available in the mask queue 23f (see FIG. 8 discussed below).

The insert pointer counter 47 and the size counter 48 have preset command inputs PS receiving a "flush" signal which flushes or clears the preprocessing system. However, an important feature of the invention is that a specified number of the oldest entries are retained in the mask queue 23f in the event of a flush. This feature is useful in connection with flushing the most recent portion of the queue which stores the masks for instructions after a predicted branch when the branch prediction is found to be incorrect. The number of entries to be retained is specified by Table II.

TABLE II

| No. Entries To Keep | Complex Branch, & Preceding Instruction Stalled | Memory Access | COMMENTS |
|---|---|---|---|
| 1 | 0 | 0 | The branch prediction is found to be incorrect before the current [branch] instruction is retired; keep the branch only. |
| 2 | 0 | 1 | Keep the branch instruction and the stalled memory access instruction. |
| 0 | 1 | 0 | The branch will have been completed in this case so nothing to save. |
| DON'T CARE | 1 | 1 | This case can't happen, a stalled memory access instruction cannot be retired. |

During a flush, the preset inputs PS of the insert pointer counter 47 and the size counter 48 are activated. In order to determine the present value of the insert pointer counter, the number of entries to be retained is subtracted from the number of valid entries in the queue, to determine the number of entries to be removed. The number of entries to be removed is then subtracted from the current value of the insert pointer. The subtractions and the insert pointer counting are performed according to modulo six arithmetic. The truth table of a modulo six subtractor is shown in Table III.

TABLE III

| correct | register—insert | | | | | |
|---|---|---|---|---|---|---|
| | 000 | 001 | 010 | 011 | 100 | 101 |
| 000 | 000 | 001 | 010 | 011 | 100 | 101 |
| 001 | 101 | 000 | 001 | 010 | 011 | 100 |
| 010 | 100 | 101 | 000 | 001 | 010 | 011 |
| 011 | 011 | 100 | 101 | 000 | 001 | 010 |
| 100 | 010 | 011 | 100 | 101 | 000 | 001 |
| 101 | 001 | 010 | 011 | 100 | 101 | 000 |
| 110 | 000 | 001 | 010 | 011 | 100 | 101 |

The preset value for the size counter 48 is either the number of entries to be retained, if an instruction is not being retired during the flush, or one less than the number of entries to be retained, if an instruction is being retired. This selective presetting of the size counter 48 is necessary because the number of entries to be retained, as specified by Table II, includes any instruction being retired. As illustrated in FIG. 6, a pair of modulo six subtractors 50 and 51 receive a signal representing the number of entries to be retained. The subtractor 50 receives this signal at its negative input, and its positive input receives the output of the size counter 48. The output of the subtractor 50 is supplied to the negative input of a third modulo six subtractor 52, whose positive input receives the output of the insert pointer counter 47.

Thus, the output of the subtractor 52 represents the difference between the number of valid entries in the queue and the number of entries to be removed. This signal is the preset value input to the counter 47.

The positive input of the subtractor 51 receives the signal representing the number of entries to be retained, and this value becomes the preset value for the size counter if an instruction is not being retired during the flush. If an instruction is being retired, the preset value for the size counter is reduced by one in the subtractor 51.

It should be noted that when the increment and decrement inputs of the size counter 48 are both active, the value of the size count should not change. As is conventional, it is assumed that when a flush occurs to preset the size counter, the signals on the increment and decrement inputs are ignored; this is of course presumed since the preset output is selectively subtracted by one based on the state of the instruction retired or removal signal. Therefore, the size counter is constructed in the conventional fashion by a register, a multiplexer having the preset, increment and decrement signals as select signals, and various feedback paths including add-by-one and subtract-by-one circuits from the output of the register to the various inputs of the multiplexer.

Each of the six output signals Q0-Q5 from the valid-queue-entry logic 46 enables or disables the thirty AND gates associated with one of the six registers 40-45 in the mask queue. Whenever one of these control signals is asserted, it signifies that a valid mask is present in the corresponding register of the mask queue 23f; consequently, the thirty AND gates associated with that register are enabled to allow the mask in that register to become a part of the composite mask that is used to determine whether a register conflict exists. For example, the assertion of output signal Q0 from the logic 46 enables the thirty AND gates A1-A30 associated with the corresponding register 40 in the mask queue 23f. It will be appreciated that any number of the six output signals Q0-Q5 may be asserted at the same time, depending upon the number of valid entries in the mask queue.

Figure 7:
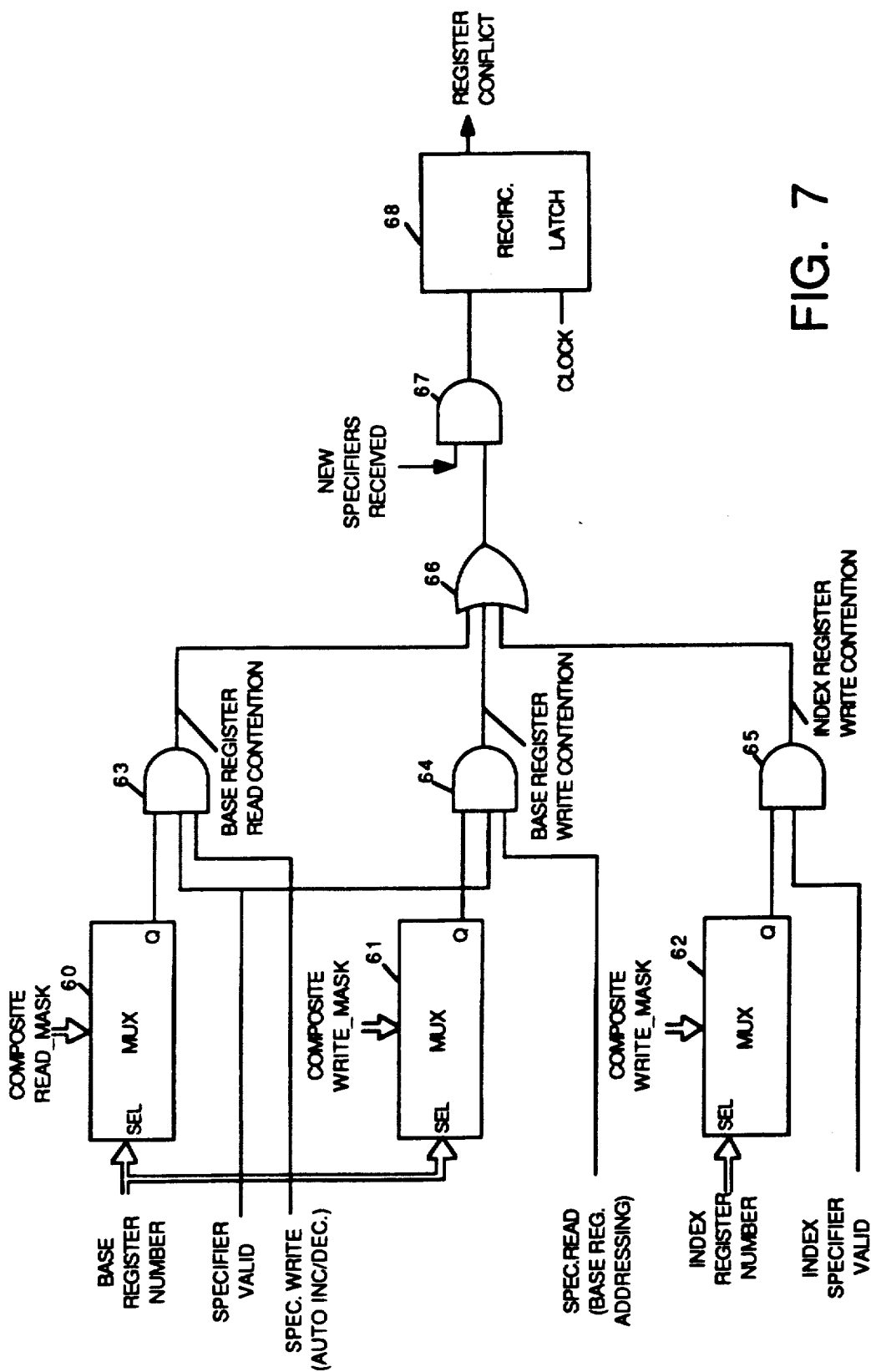
FIG. 7 is a schematic diagram of register conflict detector circuitry which inspects the read and write masks to determine whether any register conflicts exist.

From the AND gates A1-A30, B1-B30, etc., the read and write masks are supplied to thirty parallel OR gates OR1-OR30 whose outputs are connected to the multiplexers 60, 61 and 62 shown in FIG. 7 (to be described below). Each OR gate has six inputs so that masks from any of the six registers 40-45 in the mask queue can be passed on to the multiplexers 60-62. Of course, if the bit corresponding to a given GPR is set in any one of the six registers in the mask queue, that bit will result in the assertion of the output signal from the OR gate corresponding to that particular GPR. That is, each of the thirty OR gates OR1-OR30 corresponds to one of the thirty bit positions in each of the registers 40-45, and each OR gate receives inputs from each of the six registers 40-45 in the mask queue. Thus, the outputs of the OR gates OR1-OR30 represent composite read and write masks for all the instructions represented by entries in the mask queue. Specifically, the fifteen OR gates OR1–OR15 produce a composite write mask, and the fifteen OR gates OR16–OR30 produce a composite read mask.

The six registers 40–45 in the mask queue are controlled by clock enable (CE) signals from a decoder 53, as illustrated in FIG. 5. The 30-bit composite read/write mask from the decoder 20f is delivered to the six registers 40–45 over a bus 54. The decoder 53 receives the 3-bit "insert pointer" signal from the counter 47, and thus the decoder 53 enables only one of the registers 40–45 to receive the composite read/write mask present on the bus 54 at any given time. The decoder 53 is sequenced each time a new instruction is decoded, by applying to the output enable (OE) line of the decoder 53 the same new-instruction-decoded signal that increments the insert pointer counter 47 and the size counter 48.

From the mask queue 23f, the composite read and write masks in the six registers 40–45 are supplied via the thirty OR gates OR1–OR30 to the three multiplexers 60–62 (FIG. 7) so that the composite masks can be used in three simultaneous comparisons to determine whether any register conflicts exist. The first multiplexer 60 receives the composite read mask from the OR gates OR16–OR30, and compares that mask with a base-register number from the most recently decoded specifier. This read mask identifies GPRs to be read by the execution unit 13 during execution of all previously decoded instructions which have not yet been fully executed; if any of these GPRs were to be prematurely modified by the preprocessing of an instruction in the instruction unit 12, the wrong data would be read during the subsequent execution of preceding instructions in the execution unit. Such premature modifications could be effected by autoincrementing or autodecrementing of the GPRs in question. Normally there can be only one register per operand that is autoincremented or autodecremented, and this register is identified by the "base register" number, which is the number supplied to the multiplexer 60 for comparison with the composite read mask.

When the multiplexer 60 detects that the register identified by the base-register number is a register having a set bit in the composite read mask, the Q output of that multiplexer is asserted. This output is one of the inputs to an AND gate 63, which also receives as inputs a "specifier valid" signal indicating whether the base register specifier is valid, and a "specifier write" signal indicating whether that specifier is auto increment or decrement. When all three inputs are asserted, a register read conflict exists, and the output of the AND gate 63 is asserted to indicate that fact.

The second multiplexer 61 receives the composite write mask from the OR gates OR1–OR15, and compares that mask with the same base-register number supplied to the multiplexer 60, i.e., the base-register number from the most recently decoded specifier. This write mask identifies GPRs to be written by the execution unit 13 during execution of all previously decoded instructions which have not yet been fully executed; if any of these GPRs were to be prematurely read during the preprocessing of an instruction in the instruction unit 12, the wrong register data would be read and used as an operand address for that instruction, and consequently the wrong operand data would be fetched from memory and used during the subsequent execution of that instruction in the execution unit.

When the multiplexer 61 detects that the register identified by the base-register number is a register having a set bit in the composite write mask, the Q output of that multiplexer is asserted. This output is one of the inputs to an AND gate 64, which also receives as inputs the same "specifier valid" signal supplied to the AND gate 63, and a "specifier read" signal indicating whether that specifier uses the base register for address generation. When all three inputs are asserted, a register write conflict exists, and the output of the AND gate 64 is asserted to indicate that fact.

The third multiplexer 62 receives the same composite write mask supplied to the multiplexer 61, and compares that mask with an index-register from the most recently decoded specifier. As mentioned above, this write mask identifies GPRs to be written by the execution unit 13 during execution of all previously decoded instructions which have not yet been fully executed, and if any of these GPRs were to be prematurely read by the instruction unit 12 before being written by the execution unit, the wrong register data would be read.

When the multiplexer 62 detects that the register identified by the index-register number is a register having a set bit in the composite write mask, the Q output of that multiplexer is asserted. This output is one of the inputs to an AND gate 65, which also receives as inputs an "index register specifier valid" signal indicating whether the index register specifier is valid. When both inputs are asserted, the output of the AND gate 65 is asserted to indicate that a register write conflict exists. This "register conflict" signal is used to stall the preprocessing operation currently in progress until the register conflict is cleared.

The outputs of the three AND gates 63–65 are connected to a single OR gate 66 which passes an asserted output from any of the three AND gates 63–65 to a fourth AND gate 67 which controls the setting of an output latch 68. More specifically, the fourth AND gate 67 receives as its second input a control signal which is asserted only when the detector first receives new specifiers. This prevents the detection of an intra-instruction conflict which could occur if the specifiers for a newly decoded instruction were compared with a composite read or write mask which includes a mask generated for that same instruction.

Figure 8:
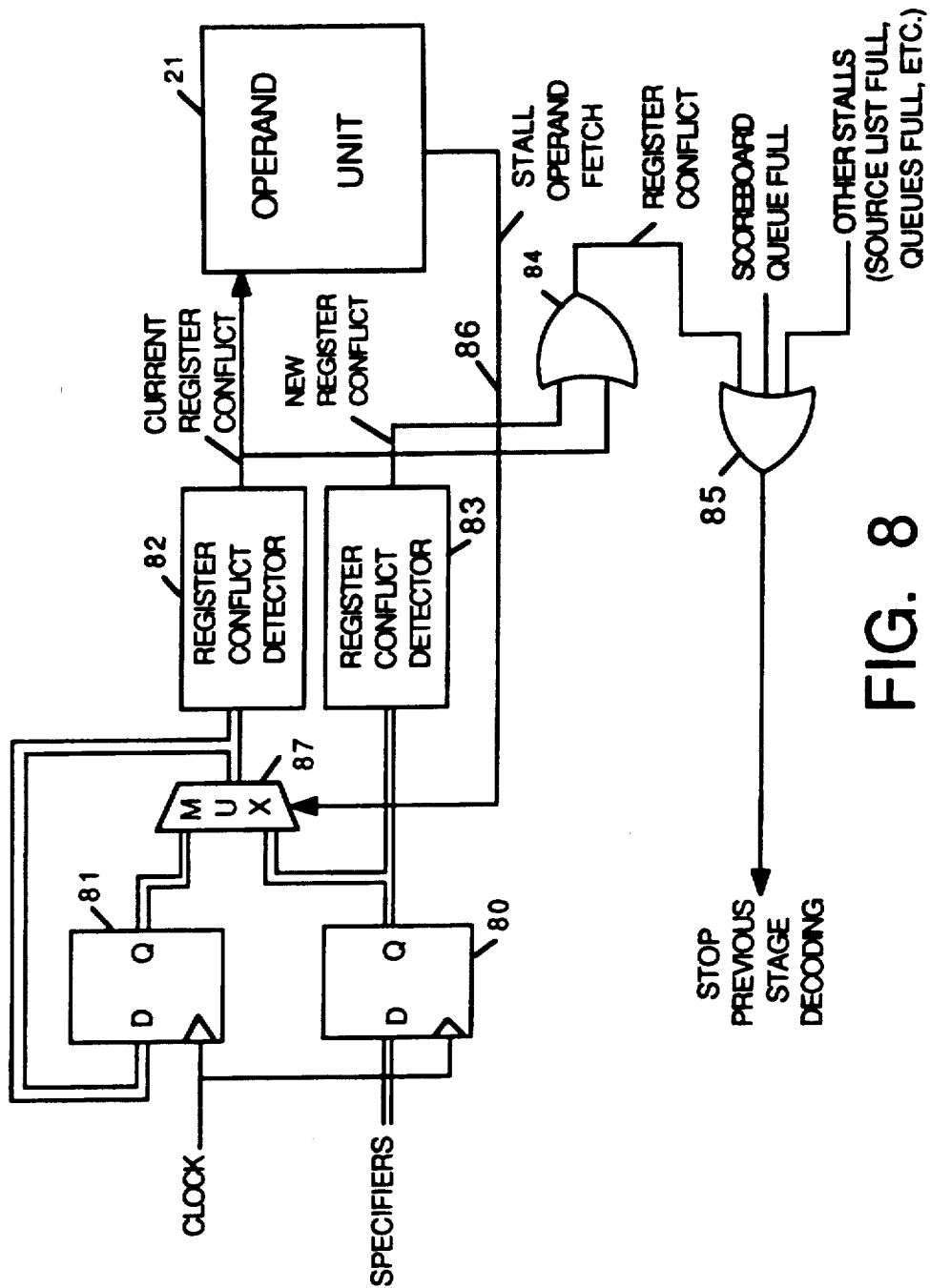
FIG. 8 shows how a pair of register conflict detectors are used to obtain a current register conflict signal and a new register conflict signal in a double-buffered pipeline stage including the operand unit.

In order to hold specifier information during a stall, double buffering is provided between the pipeline stages. Thus, as illustrated in FIG. 8, in addition to the conventional transfer register 80 which passes information between pipeline stages, there is provided a holding register 81 which holds the information during a stall. The output of the transfer register 80 is supplied to both a "current" register conflict detector 82 and a "new" register conflict detector 83. When a register conflict is detected, the output of the detector 82 (1) is passed through a pair of OR gates 84 and 85 to stall instruction decoding, and (2) causes the operand unit 21 to supply a stall signal via line 86 to the select input of a multiplexer 87 which determines whether the detector 82 receives its input from the transfer register 80 or the holding register 81.

Normally, the multiplexer 87 passes the specifiers from the transfer register 80 to the detector 82, but a stall signal from the operand unit on line 86 causes the multiplexer to select the holding register 81. Thus, the specifier which initiates the conflict is maintained as an input to the detector 82 to enable that detector to determine when the conflict has been eliminated, even though the data in the transfer register 80 changes.

The "new" register conflict detector 83 permits the detection of a new register conflict due to a specifier received by the transfer register while the detector 82 is still connected to the holding register 81. The detection of such a new conflict causes the output of the detector 83 to be asserted and applied via the OR gates 84 and 85 to the stall line leading to the instruction decoder. As indicated in FIG. 8, the OR gate 87 also receives stall signals from other sources, such as the "full" signals from the queues 23 and the source list 24.

We claim:

1. A method of prepossing multiple instructions prior to execution of such instructions in a digital computer having an instruction decoder, an instruction execution unit, and multiple general purpose registers, and in which said general purpose registers are read to produce memory addresses during the preprocessing of said instructions, said method comprising avoiding the preprocessing of a current instruction to read a general purpose register to produce a memory address prior to the modification of the contents of that register by a preceding instruction by producing an instruction write mask for each instruction that is decoded, said instruction write mask having a bit asserted for each general purpose register whose contents are to be modified by said each instruction, queuing in a mask queue the instruction write masks for a plurality of decoded but not-yet-executed instructions preceding said current instruction.

combining all of the queued instruction write masks to generate a composite write mask having a bit asserted for each general purpose register whose contents are to be modified by at least one of said plurality of decoded but not-yet-executed instructions preceding said current instruction, and stalling the processing of said current instruction when a general purpose register to be read by said current instruction is a register having a bit asserted in said composite write mask.

2. The method of claim 1 which includes the step of updating said composite write mask each time execution of an instruction is completed, and each time a new instruction is decoded.

3. The method of claim 2 which includes the step of resuming the preprocessing of said current instruction when said composite write mask no longer has a bit asserted for any general purpose register to be read by said current instruction.

4. The method of claim 2 wherein the instruction write mask for each instruction is removed from said mask queue when the execution of that instruction has been completed.

5. The method of claim 1 wherein the decoding of new instructions is stalled whenever said mask queue is full.

6. The method of claim 1 wherein a selected number of said instruction write masks are retained in said mask queue in response to a flush signal.

7. The method of claim 1 wherein said mask queue includes multiple registers, and instruction write masks for successive instructions are stored in successive registers in said mask queue.

8. The method of claim 7 which includes the step of generating an insert pointer identifying a register which is to receive each new instruction write mask in said mask queue, and incrementing said insert pointer each time a new instruction is decoded.

9. The method of claim 7 which includes the steps of generating a size signal identifying the number of instruction write masks stored in said mask queue, incrementing said size signal each time a new instruction is decoded, decrementing said size signal each time the execution of an instruction is completed, and stalling instruction decoding when said size signal reaches a predetermined maximum value.

10. The method of claim 7 wherein each instruction includes at least one source-operand specifier and at least one destination-operand specifier, and at least some of said specifiers include general purpose register specifiers, and wherein the method includes the steps of comparing selected general purpose register specifiers in said current instruction with said composite write mask to determine when a general purpose register to be read by said current instruction is a register having a bit asserted in said composite write mask.

11. The method of claim 10 which includes the step of holding a general purpose register specifier which produces an affirmative response in said comparing step, and continuing said comparison to determine when the affirmative response is cleared by removal of an instruction write mask from said mask queue.

12. The method of claim 10 wherein said computer has n general purpose registers, each instruction includes at least one source-operand specifier and at least one destination-operand specifier, and at least some of said specifiers include general-purpose-register specifiers, and wherein said composite write mask is generated by converting the general-purpose-register specifier for each general purpose register to be read by an instruction to an asserted bit on one of n lines corresponding respectively to said n general purpose registers.

13. A method of preprocessing multiple instructions prior to execution of such instructions in a digital computer having an instruction decoder, an instruction execution unit, and multiple general purpose registers, and in which said general purpose registers are read to produce memory addresses during the preprocessing of said instructions, and in which contents of said general purpose registers are modified during the preprocessing of said instructions, said method comprising avoiding the preprocessing of a current instruction to read a general purpose register to produce a memory address prior to the modification of the contents of that register by execution of a preceding instruction, and avoiding the preprocessing of a current instruction to modify contents of a general purpose register prior to the reading of the contents of that register by execution a preceding instruction, by producing an instruction write mask for each instruction that is decoded, said instruction write mask having a bit asserted for each general purpose register whose contents are to be modified by execution of said each instruction;

producing an instruction read mask for each instruction that is decoded, said instruction read mask having a bit asserted for each general purpose register to be read by execution of said each instruction;

queuing in a mask queue the instruction write masks for a plurality of decoded but not-yet-executed instructions preceding said current instruction;

queuing in said mask queue the instruction read masks for said plurality of decoded but not-yet-executed instructions preceding said current instruction;

combining all the queued instruction write masks to generate a composite write mask having a bit asserted for each general purpose register whose contents are to be modified by execution of at least one of said plurality of prior decoded instructions preceding said current instruction;

combining all the queued instruction read masks to generate a composite read mask, said composite read mask having a bit asserted for each general purpose register to be read by execution of at least one of said plurality of prior decoded instructions preceding said current instruction;

stalling the preprocessing of said current instruction when a general purpose register to be read by preprocessing of said current instruction is a register having a bit asserted in said composite write mask; and stalling the preprocessing of said current instruction when a general purpose register whose contents are to be modified by preprocessing of said current instruction is a register having a bit asserted in said composite read mask.

14. The method of claim 13 which includes the steps of updating said composite read mask and updating said composite write mask each time execution of an instruction is completed, and each time a new instruction is decoded.

15. The method of claim 13 which includes the step of resuming the preprocessing of said current instruction when said composite read mask no longer has a bit asserted for any general purpose register to be modified by preprocessing of said current instruction, and said composite write mask no longer has a bit asserted for any general purpose register to be read by preprocessing of said current instruction.

16. The method of claim 13 wherein the instruction read mask and instruction write mask for each decoded instruction is removed from said mask queue when execution of said each decoded instruction has been completed.

17. The method of claim 13 wherein a selected number of said instruction write masks and said instruction read masks are retained in said mask queue in response to a flush signal.

18. The method of claim 13 wherein said mask queue includes multiple registers, and said instruction write masks and said instruction read masks for successive decoded instructions are stored in successive registers in said mask queue.

19. The method of claim 18 which includes the step of generating an insert pointer identifying a register in said mask queue which is to receive each new instruction read mask and instruction write mask, and incrementing said insert pointer each time a new instruction is decoded.

20. The method of claim 18 which includes the steps of generating a size signal identifying a number of successive registers storing instruction read masks and instruction write masks stored in said mask queue, incrementing said size signal each time a new instruction is decoded, decrementing said size signal each time execution of an instruction is completed, and stalling instruction decoding when said size signal reaches a predetermined maximum value.

21. The method of claim 13 wherein each instruction includes at least one source-operand specifier and at least one destination-operand specifier, and at least some of said specifiers include general purpose register specifiers, and wherein the method includes the steps of comparing selected general purpose register specifiers in said current instruction with said composite write mask to determine when a general purpose register to be read by preprocessing of said current instruction is a register having a bit asserted in said composite write mask; and comparing selected general purpose register specifiers in said current instruction with said composite read mask to determine when a general purpose register to be modified by preprocessing of said current instruction is a register having a bit asserted in said composite read mask.

22. The method of claim 21 which includes the step of holding a general purpose register specifier which produces an affirmative response in either of said comparing steps, and continuing comparison to determine when the affirmative response is cleared by removal of an instruction read mask and an instruction write mask from said mask queue.

23. The method of claim 13 wherein said computer has n general purpose registers, each instruction includes at least one source-operand specifier and at least one destination-operand specifier, and at least one some of said specifiers include general-purpose-register specifiers, and wherein said composite write mask is generated by converting the general-purpose-register specifier for each general purpose register to be written by execution of an instruction to an asserted bit on one of a first set of n lines corresponding respectively to said n general purpose registers, and wherein said composite read mask is generated by converting the general-purpose-register specifier for each general purpose register to be read by execution of an instruction, to an asserted bit on one of a second set of n lines corresponding respectively to said n general purpose registers.

24. A digital computer having an instruction decoder, an instruction execution unit, multiple general purpose registers, and means for reading said general purpose registers to produce memory addresses during the preprocessing of instructions prior to instruction execution, wherein the improvement comprises:

instruction write mask generating means coupled to said instruction decoder for generating an instruction write mask for each instruction that is decoded, said instruction write mask having a bit asserted for each general purpose register whose contents are to be modified by execution of said each instruction that is decoded;

instruction read mask generating means coupled to said instruction decoder for generating an instruction read mask for said each instruction that is decoded, said instruction read mask having a bit asserted for each general purpose register whose contents are to be read by execution of said each instruction that is decoded;

a mask queue coupled to said instruction read mask generating means and said instruction write mask generating means, said mask queue including a plurality of mask registers and means for inserting into each mask register the instruction write mask and the instruction read mask for a decoded instruction;

composite write mask generating means coupled to said mask registers of said mask queue for combining instruction write masks in said mask queue to generate a composite write mask having a bit asserted for each general purpose register whose contents are to be modified by execution of at least one of a plurality of decoded but not-yet-executed instructions;

composite read mask generating means coupled to said mask registers of said mask queue for combining instruction read masks in said mask queue to generate a composite read mask having a bit asserted for each general purpose register whose contents are to be read by execution of at least one of said plurality of decoded but not-yet-executed instructions;

means coupled to said composite write mask generating means and said instruction decoder for stalling said instruction decoder when a general purpose register to be read by preprocessing of an instruction being decoded is a general purpose register for which a bit is asserted in said composite write mask; and means coupled to said composite read mask generating means and said instruction decoder for stalling said instruction decoder when a general purpose register to be written by preprocessing of an instruction being decoded is a general purpose register for which a bit is asserted in said composite read mask.

25. The improvement as claimed in claim 24, further comprising means coupled to said mask queue and said instruction decoder for stalling said instruction decoder whenever said mask queue is full.

26. The improvement as claimed in claim 24, further comprising means coupled to said mask queue for retaining instruction read masks and instruction write masks in said mask queue for a selected number of instructions in response to a flush signal.

27. The improvement as claimed in claim 24, further comprising means coupled to said instruction decoder and said mask queue for generating an insert pointer identifying a mask register in said mask queue which is to receive an instruction write mask and an instruction read mask for a new instruction that is decoded by said instruction decoder, said means for generating said insert pointer including means for incrementing said insert pointer each time a new instruction is decoded.

* * * * *

UNITED STATES PATENT AND TRADEMARK OFFICE
CERTIFICATE OF CORRECTION

PATENT NO. : 5,142,631
DATED : August 25, 1992
INVENTOR(S) : John E. Murray, et al.

It is certified that error appears in the above-indentified patent and that said Letters Patent is hereby corrected as shown below:

Column 1, line 10, change "application" to --applications--.

Column 2, line 24, change "4,043,874" to --5,043,874--.

Column 4, line 35, change "ar" to --are--.

Column 5, line 56, delete "," after "operands".

Column 9, line 39, change "ADDL3 RO.B 12(R1), R2" to --ADDL3 RO, B^12 (R1), R2.--.

Column 11, line 31, delete "10".

Column 11, line 63, after "decoded", insert --in--.

Column 15, lines 20 and 21, delete the extra spaces between "write" and "masks".

UNITED STATES PATENT AND TRADEMARK OFFICE
CERTIFICATE OF CORRECTION

PATENT NO. : 5,142,631
DATED : August 25, 1992
INVENTOR(S) : John E. Murray, et al.

It is certified that error appears in the above-indentified patent and that said Letters Patent is hereby corrected as shown below:

Column 20, line 30, after "at least" delete one.

Signed and Sealed this

Fifteenth Day of March, 1994

Attest:

BRUCE LEHMAN

Attesting Officer

Commissioner of Patents and Trademarks